United States Patent [19]

Ashida et al.

[11] Patent Number: 5,733,430
[45] Date of Patent: Mar. 31, 1998

[54] GAS DIFFUSION ELECTRODE AND ELECTROLYTIC METHOD USING IT

[75] Inventors: Takahiro Ashida, Kanagawa; Takayuki Shimamune, Tokyo; Yoshinori Nishiki, Kanagawa, all of Japan

[73] Assignee: Permelec Electrode Ltd., Kanagawa, Japan

[21] Appl. No.: 626,924

[22] Filed: Apr. 3, 1996

[30] Foreign Application Priority Data

Apr. 10, 1995 [JP] Japan .................... 7-110159

[51] Int. Cl.[6] .................................. C25B 15/02
[52] U.S. Cl. .................. 205/337; 205/343; 204/284; 204/290 R; 204/252
[58] Field of Search ................ 204/284, 290 R; 205/343, 337

[56] References Cited

U.S. PATENT DOCUMENTS

| | | | |
|---|---|---|---|
| 5,294,319 | 3/1994 | Kaczur et al. | 204/284 |
| 5,536,379 | 7/1996 | Nonaka et al. | 204/284 |

*Primary Examiner*—Bruce F. Bell
*Attorney, Agent, or Firm*—Sughrue, Mion, Zinn, Macpeak & Seas, PLLC

[57] ABSTRACT

A gas diffusion electrode is constituted by forming a porous layer comprising a super-fine particle catalyst of silver or gold and a fluorine-containing material on a substrate and connecting a gas-liquid permeable collector to the substrate.

The gas diffusion electrode can be used stably as an oxygen cathode for a sodium chloride electrolysis, etc., for a long period of time without causing decreased water repellency of the fluorine-containing material in the gas diffusion electrode and without lowering the activity of the electrode substance.

3 Claims, No Drawings

GAS DIFFUSION ELECTRODE AND ELECTROLYTIC METHOD USING IT

FIELD OF THE INVENTION

The present invention relates to a gas diffusion electrode which can be used in a stable manner under severe conditions, in particular, a gas diffusion electrode which can be stably operated for a long period of time even in an alkali solution wherein oxygen gas exists, such as a sodium chloride electrolytic cell, and to an electrolytic method using the gas diffusion electrode.

BACKGROUND OF THE INVENTION

A cathodic reaction in industrial electrolysis such as a caustic alkali electrolysis is mainly a hydrogen generating reaction except metal winning and plating. The hydrogen generated thereby is, in some cases, effectively used but is generally wasted. It is well known that even when the generated hydrogen is effectively used, much energy is spent for the generation of hydrogen in electrolysis.

For reducing the consumption of energy many have attempted to use gas diffusion electrodes investigated and developed mainly in the field of fuel cells. When the gas diffusion electrode is applied to an energy efficient ion-exchange membrane-type sodium chloride electrolysis (having an electrolytic voltage of about 3 volts) a reduction of the voltage of about 1 volt as a theoretical decomposition voltage from the electrode reaction may be attained. This results in a reduction of the electric power consumption of about 40%. In this respect, a real voltage reduction of from 0.9 volt to 1 volt is reported in the literature.

These gas diffusion electrodes are all in sheet form. The main material constituting the gas diffusion electrode is a carbon powder comprising mainly graphite, the carbon power being lumped using a fluorine resin as a binder. The gas diffusion electrode is produced by increasing the amount of the fluorine resin at one surface to impart water repellency, reducing the amount of the fluorine resin at the opposite surface to impart a hydrophilic property, and carrying platinum or other electrode substances on the carbon powder. Also, there are gas diffusion electrodes wherein a wire mesh is inserted in the electrode sheet, and an electric current is passed through the wire mesh and gas diffusion electrodes wherein a carbon fiber mesh is inserted in the sheet in place of the wire mesh, the whole assembly being integrated in a body to improve the physical strength and to impart electric conductivity to the water-repellent side of the sheet. An electric current is passed through a collector equipped separately in such electrodes.

Each of these electrodes lumped together by heating with a carbon powder carrying an electrode substance using a fluorine resin as the binder with the lumped sheet carried on a substrate such as titanium, nickel, stainless steel, etc., have the features of easy production and a three-dimensional solid skeleton capable of becoming a strong sheet such as the so-called PTFE (polytetrafluoroethylene), etc., is not formed. Even if the crosslinkage of the fluorine resin of such a gas diffusion electrode is insufficient, when the gas diffusion electrode is used for the depolarization of oxygen as a cathode by introducing an oxygen-containing gas, the gas diffusion electrode performs satisfactorily and stably at the beginning of use. However, since a fluorine resin is not always stable in an alkali, the water repellency of such an electrode is decreased when the electrode is used for a long period of time. Moreover, the activity of the electrode substance may be reduced. Thus, the good performance of such gas diffusion electrodes is maintained for a short time but usually not for more than one year.

The substrate described above is stable in an alkali for generating hydrogen, and it is used as a material for cathodes in an ordinary sodium chloride electrolysis. However, when the electrolysis is carried out in an alkali while supplying an oxygen-containing gas, the carbon powder and nickel become chemically unstable. This is caused by it being oxidized and corroded with oxygen supplied or hydrogen peroxide formed by the reduction of oxygen.

These problems are considered to be the main cause for gas diffusion electrodes not being industrially used though saving energy by the use of such electrodes has been investigated in the process of producing sodium hydroxide or caustic soda by the electrolysis of sodium chloride or producing caustic soda and sulfuric acid by the electrolysis of Glauber's salt.

Also, the passage of an electric current to the gas diffusion electrode is not easy as compared with the passage to a conventional porous electrode. Thus, the difficulty of passing an electric current to large-sized electrolytic cells is also one of the reasons that practical electrolysis using the gas diffusion electrode has not yet been realized.

SUMMARY OF THE INVENTION

Accordingly, one object of the present invention is to solve the problems in the conventional techniques described above. That is one object is to provide a gas diffusion electrode for sodium chloride electrolysis, Glauber's salt electrolysis, which may be used stably for a long period of time even in an alkali.

Another object of the present invention is to provide a method for electrolysis using the gas diffusion electrode.

That is, according to one embodiment of the present invention, there is provided a gas diffusion electrode comprising a gas-liquid permeable metal substrate carrying thereon an electrode catalyst and a gas-liquid permeable collector connected to the substrate.

According to another embodiment of the present invention, there is provided a method for electrolysis which comprises mounting the gas diffusion electrode to a cathode chamber side of an ion-exchange membrane partitioning a sodium chloride electrolytic bath into an anode chamber and the cathode chamber or a cathode chamber side of an ion-exchange membrane partitioning a Glauber's salt electrolytic cell into an intermediate chamber and the cathode chamber in close contact.

The present invention relates to a gas diffusion electrode comprising a gas-liquid permeable substrate carrying thereon an electrode catalyst and a gas-liquid collector connected to the substrate. In such gas diffusion electrode, when a mixture of super-fine particles of silver and/or gold and a fluorine-containing material are used as the electrode catalyst, the reduction in the water repellency of the fluorine-containing material over time is restrained. Hence, stable operation become possible. The attempts to use conventional gas diffusion electrodes as the oxygen cathode for a sodium chloride electrolysis was almost frustrated by a reduction in the water repellency of the oxygen cathode in an alkali solution. The present invention provides a gas diffusion electrode for the practical production of caustic soda by sodium chloride electrolysis or Glauber's salt electrolysis.

Also, when the contact portion of the substrate of the gas diffusion electrode with an alkali solution is covered with silver and/or gold being durable to the alkali solution, the corrosion of the substrate is prevented and a gas diffusion electrode having a longer life is obtained.

When the gas diffusion electrode is used for sodium chloride electrolysis, etc., the gas diffusion electrode is mounted in the cathode chamber side of an ion-exchange membrane partitioning an electrolytic cell into an anode chamber or an intermediate chamber and the cathode chamber in close contact to the cathode chamber side of the ion-exchange membrane. Electrolysis is carried out while supplying water containing a sodium ion to the anode chamber or the intermediate chamber and an oxygen-containing gas to the cathode chamber side. Thus, the effects described above are obtained, and an electrolytic method which can easily provide supply of gas to the surface of the ion-exchange membrane, removal of the gas, and removal of caustic soda thereby formed is provided.

DETAILED DESCRIPTION OF THE INVENTION

The present invention is described in detail below.

In the present invention, decrease in water repellency of the fluorine-containing material caused by extended use is prevented by using a specific metal as the metal substrate described above. Thereby a gas diffusion electrode which can be used without decreasing the water repellency even after extended use is produced. It can be used stably for a long period of time.

As the metal (electrode material), silver and/or gold are most suitable. Since a metal catalyst in a conventional gas diffusion electrode is carried on carbon black, the diffusion thereof is good. However, in the present invention, the metal catalyst is carried on the metal via a fluorine-containing material such as a fluorine resin, fluorinated graphite, etc. Thus it is difficult to obtain good dispersibility as with a conventional metal catalyst. Accordingly, it is preferable to obtain similar dispersibility as with the conventional carbon black carried catalyst by using super fine particles of the metal catalyst having a particle size of, for example, from about 10 to 1000 Å.

It is preferred that the metal substrate carrying the catalyst via a fluorine-containing material be wholly comprised of a material such as silver and/or gold, etc. Further, the surface of the substrate which is brought into contact with the alkali solution may be formed with a material such as silver and/or gold, etc., or coated with plating, etc. In the case of plating, it is preferred that the pore diameter of the substrate be from 0.01 to 5 mm, the thickness of the substrate be from 0.05 to 0.5 mm, and the porosity be from 40 to 90%.

Also, since it is necessary for the substrate to be gas-liquid permeable, the substrate must be formed as a porous material. For example, a silver net or a three-dimensional network material is used as the substrate, or the material is formed by plating silver, etc., on a porous substrate made of a resin or other metal. The silver net is prepared by, for example, applying electroless plating or electrolytic plating of silver to a foaming resin as a skeleton and then burning to remove the foamed resin and to prepare a silver-made porous sheet. That is, silver net (thickness preferably from about 0.5 to 1 mm), or net made from silver or a three-dimensional network made from silver may be formed by burning silver fibers having a diameter of from about 0.01 to 0.5 mm. If the surface which is brought into contact with an alkaline solution is substantially covered with silver, other material may be used for other portions, and when a metal is used in place of the above-described skeletal resin, the metal need not be removed by burning. A substrate comprising the metal plated with silver is thereby obtained.

A mixture of fine particles of silver and/or gold and the fluorine-containing material is applied onto the substrate to form a porous three-phase interfacial material (porous layer). Super-fine silver particles having a particle diameter of from 50 to 1,000 Å and having a uniform particle size, for example, commercially available as "carbonyl silver" may be used. Super-fine gold particles having a particle size of from 50 to 1,000 Å, for example, independently dispersed gold particles formed by an evaporation method in gas, may be used. It is desirable that these gold particles be prepared such that they have particle sizes as uniform as possible to minimize the particle size distribution.

There is no particular restriction on the kind of the fluorinated graphite as long as the water repellency is insured.

The porous layer described above can be formed by kneading these super-fine metal particles and the above-described fluorine-containing material, coating the substrate with the kneaded mixture, and burning at a temperature of, for example, from 150° to 380° C. by a hot press method, etc., it may also be formed by coating the substrate with a paste prepared by sufficiently mixing carbonyl silver, fluorinated graphite, and a surface active agent with water and burning the coated substrate at a temperature of from 350° to 600° C. in a reducing atmosphere or an inert gas atmosphere under streaming with a mixture of hydrogen, nitrogen, or argon. By these methods, the porous layer can be formed by the manner of so-called loose sintering so that only the contact portion is sintered without crushing spaces among the particles. A porous layer having an excellent gas permeability is thus obtained.

A gas-liquid permeable collector is connected to the gas-liquid permeable substrate having formed on the surface thereof a porous layer to obtain the gas diffusion electrode of the present invention. It is preferred that the collector comprises a gas-liquid permeable member having a pore diameter of from 1 to 55 mm, a thickness of from 1 to 5 mm, and a porosity of from 30 to 70%. When the collector has less electric conductivity or strength, a supporting member having a high strength may be used. It is preferred that the supporting member has open portions for imparting gas-liquid permeability, and the surfaces of open holes may be rendered water repellent using fluorinated graphite or a fluorine resin. Also, it is preferred that the diameter of the open portions of the supporting member be from 1 to 10 mm, the thickness of the supporting member be from 0.5 to 5 mm. For carrying out oxygen reduction in an alkali solution, a chemically stable and inert cover of silver, gold, or an alloy thereof may be formed on the surface of the supporting member, whereby the surface is not substantially exposed in an electrolytic solution.

In the gas diffusion electrode of the present invention, the electrode is substantially composed of a metal, whereby the reduction of the water repellency of the fluorine-containing material contained in the porous layer is restrained. Accordingly, the gas diffusion electrode of the present invention may be used for electrolysis in a highly alkaline solution in the presence of oxygen (which may reduce the water repellency of the fluorine-containing material). That is, it may be used for the formation of caustic soda by sodium chloride electrolysis or Glauber's salt electrolysis as the oxygen cathode, the use of a gas diffusion electrode for sodium chloride electrolysis which has not been substantially practiced before.

For applying the gas diffusion electrode of the present invention as the oxygen cathode for sodium chloride electrolysis or Glauber's salt electrolysis, the electrolysis is carried out by closely contacting the gas diffusion electrode to the cathode surface of an ion-exchange membrane for a sodium chloride electrolysis partitioning the electrolytic bath into an anode chamber and a cathode chamber or to the cathode surface of an ion-exchange membrane for Glauber's salt electrolysis partitioning the electrolysis bath into an intermediate chamber and a cathode chamber.

When the electrolysis for forming caustic soda is carried out by the configuration as described above, the passage for passing water through the ion-exchange membrane and caustic soda formed to the back surface of the electrode is formed. Since the passage is chemically stable, the formation of stains and clogging of the gas supply do not occur.

As the ion-exchange membrane described above, a fluorine resin series membrane having a sulfonic acid ion exchange group or a carboxylic acid ion exchange group, which is used for ordinary sodium chloride electrolysis is preferred. In particular, an ion-exchange membrane for a high concentration, which can carry out the formation of 50% caustic soda at a high efficiency, recently developed can also be used in the present invention.

Examples of the gas diffusion electrode of the present invention and the electrolytic method using the gas diffusion electrode are described below, but the invention is not limited by the examples. Unless otherwise indicated herein, all parts percents, ratios and the like are by weight.

EXAMPLE 1

In a mixed solvent of naphtha and isopropyl alcohol, a silver powder having a mean particle size of 700 Å (made by Sinku Yakin K.K.) and an aqueous dispersion of PTFE were dispersed in such a manner that the ratio of silver/PTFE became 2/1 or 1/1 (by volume ratio) to prepare two kinds of coating liquids.

About 3.5 g of the coating liquid having a mixing ratio of 1/1 by volume was coated on one surface (back surface) of a nickel cermet (length 100 mm, width 100 mm, and thickness 1 mm), applied with silver plating (the plated thickness was about 10 μm) and dried for 5 minutes at 210° C. About 3 g of the coating liquid having a mixing ratio of 2/1 by volume was coated on the other surface thereof and dried under the same condition as above to obtain an electrode substrate.

After carrying out etching of a nickel mesh (length 100 mm, width 100 mm, and thickness 0.2 mm) in boiling 20% hydrochloric acid for 10 minutes for enlarging the surface area and surface graining, silver plating of 10 μm thick was applied to the surface thereof. Furthermore, about 0.15 g of a coating liquid prepared by mixing the silver powder and an aqueous dispersion of PTFE such that the ratio of silver/PTFE became 1.5/1 (by volume ratio) was coated on the silver-plated surface of the nickel mesh, dried for 30 minutes at 60° C. The step was repeated to prepare a hydrophobic collector having an electrically conductive hydrophobic layer of 30 μm thickness.

After hot-pressing (5 minutes at 350° C.) the above collector to the back surface of the electrode substrate described above to press-contact the collector such that the thickness became 0.8 mm, the assembly was burned for 90 minutes at 370° C. to obtain a gas diffusion electrode (A).

Comparative Example 1

By following the same procedure as in Example 1 except that silver plating was not applied to the nickel cermet, a gas diffusion electrode (B) was prepared.

EXAMPLE 2

By following the same procedure as in Example 1 except that the amount of the coating liquid of the silver powder and PTFE applied to the front surface of the nickel cermet was changed to about 2 g, an electrode substrate was prepared. Furthermore, one gram of a coating liquid prepared by mixing an independently dispersed super-fine silver particle liquid (silver particle sizes were from 50 to 100 Å) and PTFE such that the ratio of silver/PTFE was 2/1 (by volume ratio) was coated on the surface of the electrode substrate followed by drying to carry the super-fine silver particles on the electrode substrate. Thereafter, by following the same procedure as in Example 1 using the electrode substrate, a gas diffusion electrode (C) was prepared.

Comparative Example 2

By following the same procedure as in Example 2 except that silver plating was not applied to the nickel cermet, a gas diffusion electrode (D) was prepared.

EXAMPLE 3

Each of the four gas diffusion electrodes prepared by the examples and the comparative examples described above was used as an oxygen cathode. The oxygen cathode was closely contacted with the cathode side of a cation-exchange resin membrane, (Nafion 961, trade name, made by E. I. du Pont de Nemours and Company) of a sodium salt electrolytic cell partitioned by the cation-exchange membrane into an anode chamber and a cathode chamber. A titanium-made porous dimensional stable electrode carrying iridium oxide as an electrode substance was used as the anode and was closely contacted to the anode side of the cation-exchange membrane.

Oxygen gas and steam were supplied into the cathode chamber from the back surface of the gas diffusion electrode, an aqueous solution containing 20% sodium chloride and 30% caustic soda was supplied to the anode chamber, and the initial cell voltage and the initial cathode potential were measured under the conditions of a cell temperature of 90° C. and a current density of 30 A/dm$^2$. The results showed that in the case of using each gas diffusion electrode, the initial cell voltage was 2.45 volts and the initial cathode potential was about −0.7 volts [rs. S.C.E.], which were almost the same.

Similarly, when the current density for the formation of caustic soda was measured, in the cases of using electrode A and electrode C, the initial current efficiency was from 94 to 96% and in the cases of using the electrode B and electrode D, the initial current efficiency was 95%.

The electrolysis was then continued under the same conditions using each of the gas diffusion electrodes and a long electrolysis test was performed.

In the case of using electrode C, the cell voltage increased to 2.60 volts after 20 days but thereafter, the cell voltage was stabilized, and the current efficiency was scarcely changed even when the electrolysis was continued over 200 days.

On the other hand, in the case of using electrode D, the bath voltage gradually increased, became 2.60 volts after 20 days, and became 2.75 volts after 100 days.

In the case of using electrode A, the cell voltage was kept in the range of from 2.4 to 2.45 volts over 200 days, the electrolysis was stably carried out, and the current efficiency was scarcely changed when the electrolysis was carried out over 200 days.

In the case of using electrode B, the cell voltage was stable, was not increased from the initial voltage of 2.45 volts for 80 days, but thereafter, the cell voltage increased gradually. The current efficiency was not changed and no abnormal phenomenon occurred in the ion-exchange membrane.

As described above, the gas diffusion electrodes using silver as the metal catalyst have excellent stability over a long period as compared to gas diffusion electrodes using platinum as the metal catalyst. This makes it possible to apply such electrodes to a sodium chloride electrolysis capable of being continuously performed for a long period of time without exchanging the gas diffusion electrode.

EXAMPLE 4

By following the same procedure as in Example 1 except that a gold powder was used in place of the silver powder in Example 1, a gas diffusion electrode was prepared.

By using the electrode, the initial cell voltage, the initial cathode potential, and the current density were measured as in Example 3. The results showed that the initial cell voltage was 2.35 volts and the cathode potential was 0.64 volts as the SCE standard, and overvoltage was slightly lower as compared with the case of using the gas diffusion electrode using silver as the metal catalyst. In addition, the current efficiency was 95%, and no abnormal phenomenon was observed in the ion-exchange membrane.

While the invention has been described in detail and with reference to specific embodiments thereof, it will be apparent to one skilled in the art that various changes and modifications can be made therein without departing from the spirit and scope thereof.

What is claimed is:

1. A gas diffusion electrode comprising a gas-liquid permeable metal substrate carrying an electrode catalyst and a gas-liquid permeable collector connected to the substrate, said substrate and said collector each having a surface, wherein the surface of the metal substrate and the surface of the collector are substantially silver, gold or a mixture thereof.

2. The gas diffusion electrode of claim 1, wherein the electrode catalyst comprises a mixture of silver and gold particles having a particle size of from about 10 to 1,000 Å and a fluorine-containing material.

3. A method for electrolysis which comprises:
   mounting a gas diffusion electrode comprising a gas-liquid permeable metal substrate having a surface of silver, gold or a mixture thereof, said substrate carrying an electrode catalyst, and a gas-liquid permeable collector having a surface of silver, gold or a mixture thereof, said collector connecting to the substrate in a cathode chamber side of an ion-exchange membrane,
   partitioning a caustic soda electrolytic cell into an anode chamber and the cathode chamber or into an intermediate chamber and the cathode chamber in close contact with the cathode side of the ion-exchange membrane and
   performing electrolysis while supplying sodium ion-containing water into the anode chamber or the intermediate chamber and supplying an oxygen-containing gas into the cathode chamber side.

* * * * *